July 26, 1949.　　　L. H. SNYDER ET AL　　　2,477,150
PORTABLE ELECTRIC MOTOR OR THE LIKE
Filed June 7, 1946　　　　　　　　　　　　　5 Sheets-Sheet 1
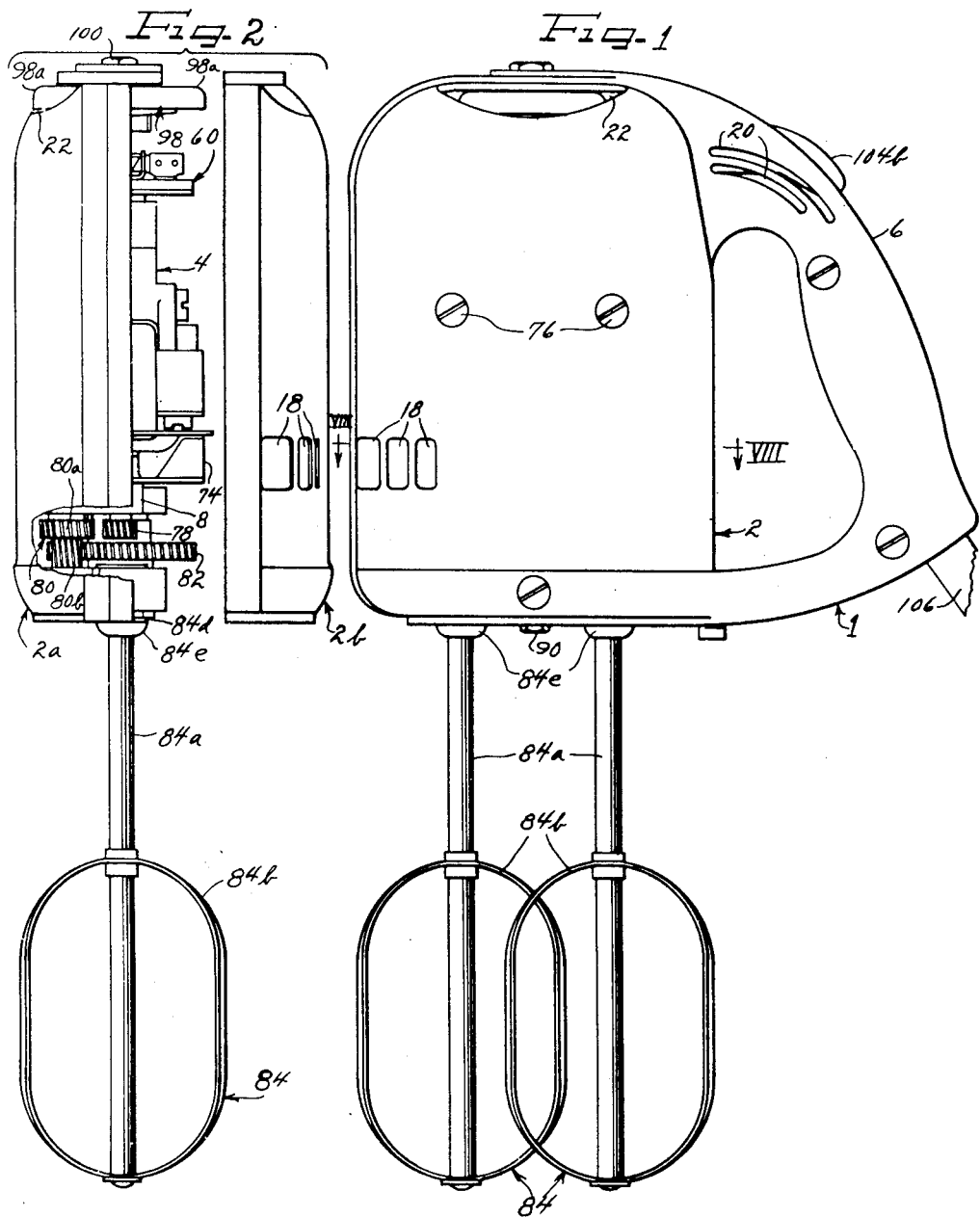
Inventors
Leland H. Snyder
Kermit D. Yost
by The Firm of Charles W. Hills
Attys July 26, 1949.  L. H. SNYDER ET AL  2,477,150
PORTABLE ELECTRIC MOTOR OR THE LIKE
Filed June 7, 1946  5 Sheets-Sheet 2
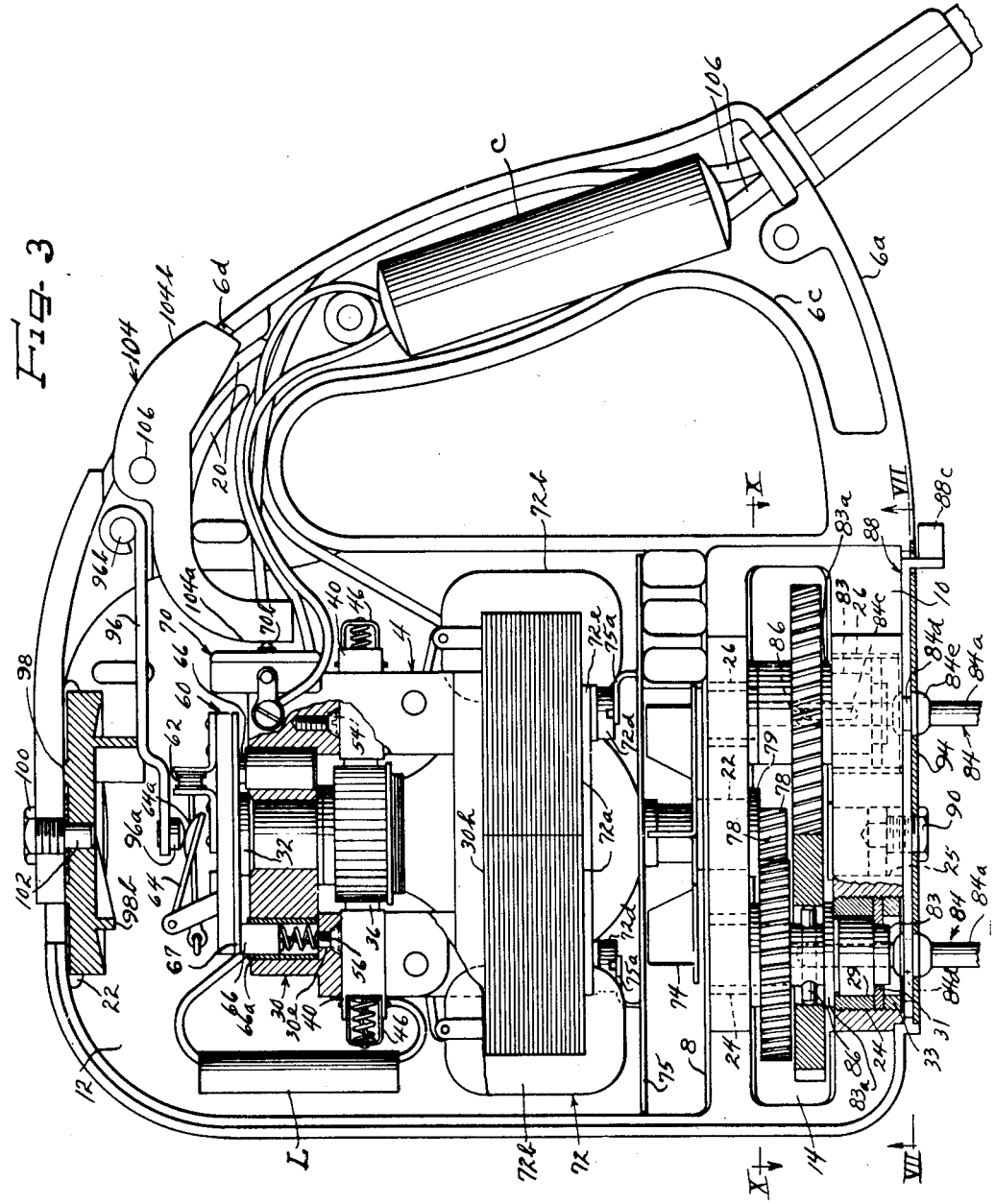
Inventors
Leland H. Snyder
Kermit D. Yost
by The Firm of Charles W. Hill
Attys July 26, 1949. L. H. SNYDER ET AL 2,477,150
PORTABLE ELECTRIC MOTOR OR THE LIKE
Filed June 7, 1946 5 Sheets-Sheet 3

Inventors
Leland H. Snyder
Kermit D. Yost
by The Firm of Charles W. Hills
Attys

July 26, 1949.  L. H. SNYDER ET AL  2,477,150
PORTABLE ELECTRIC MOTOR OR THE LIKE
Filed June 7, 1946                    5 Sheets-Sheet 4

Inventors
Leland H. Snyder
Kermit D. Yost
by The Firm of Charles W. Hills
Attys

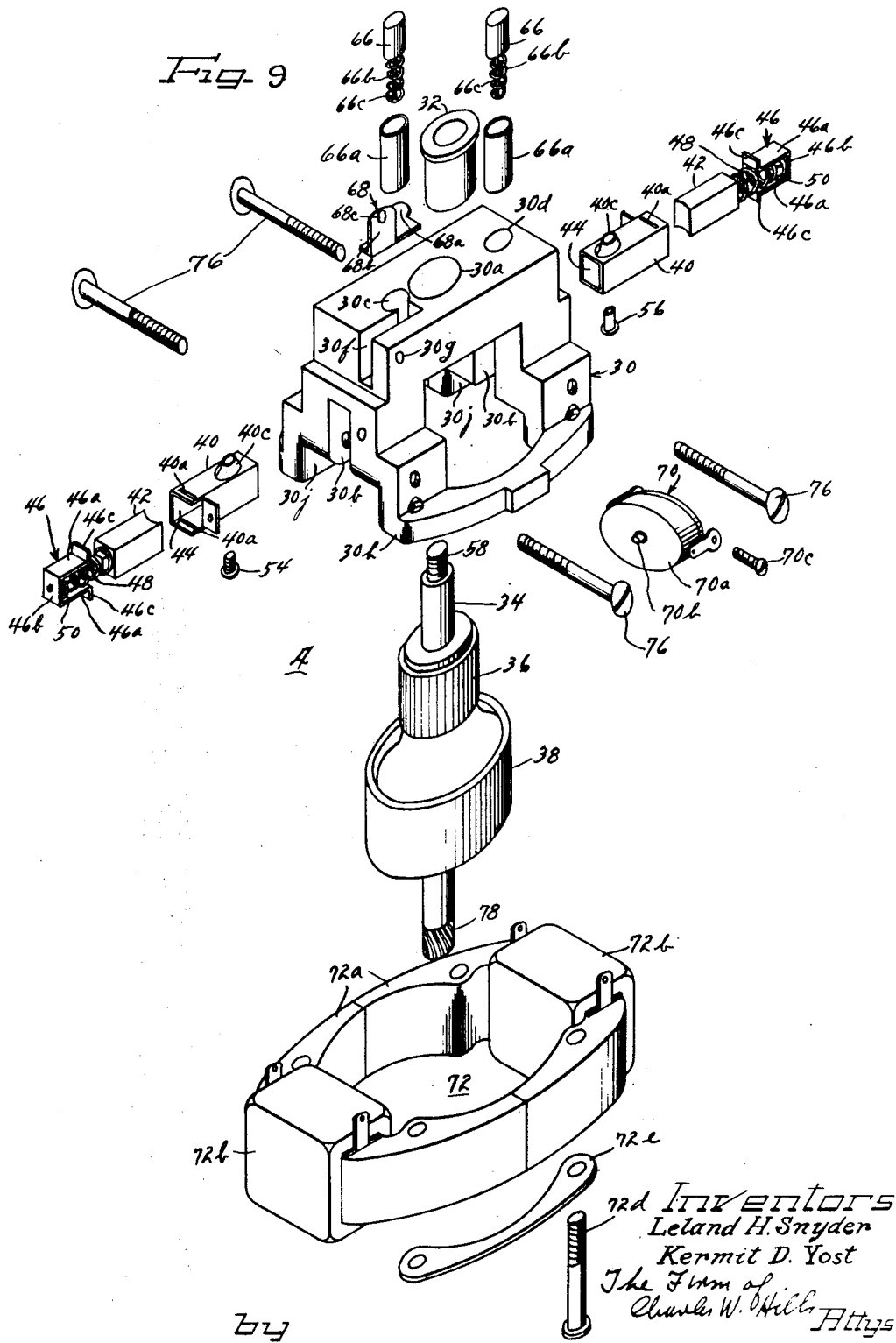

Patented July 26, 1949

2,477,150

UNITED STATES PATENT OFFICE 2,477,150

PORTABLE ELECTRIC MOTOR OR THE LIKE

Leland H. Snyder and Kermit D. Yost, Chicago, Ill., assignors, by mesne assignments, to Knapp-Monarch Company, St. Louis, Mo., a corporation of Delaware Application June 7, 1946, Serial No. 675,270

14 Claims. (Cl. 172—36)

This invention relates to a power tool, and particularly to a power tool which is constructed to be held in the hand of the operator while in use, such as a food mixer.

Power tools of the class to which this invention relates generally comprise a hollow casing within which the motor and reduction gearing are mounted and out of which project one or more driving shafts, which shafts, in the particular application of this invention to a food mixer, comprise the beater element of the food mixer.

For convenience in grasping the power tool while in use, a handle is generally provided on such tool and it is customary to provide some form of a speed control member which is accessible exteriorly of the casing to permit the convenient manual adjustment of the speed of the motor.

A feature of this invention lies in the provision of an improved casing arrangement wherein the speed control member is disposed at one axial end of the casing and constitutes a generally circular, rotatable member having marginal portions thereof projecting outwardly through apertures in the casing so that they may be conveniently engaged by the fingers of the operator.

A further feature of this invention lies in the mounting of all of the essential components of the motor upon a single block of insulating material, which is in turn secured in the casing to mount the assembled motor unit therein. Such novel mounting block not only greatly simplifies the assembly of the motor within the casing of the power tool but also permits the motor unit to be pre-assembled exteriorly of the casing and hence greatly facilitates various assembly operations on the motor, particularly the completion of the necessary wiring connections therefor.

A further feature of this invention is the provision of an improved ventilating arrangement for the motor of a power tool. In accordance with this invention, each of the casing parts, which are joinable to define a casing completely enclosing the motor, is provided with an inwardly projecting rib which cooperates with a fan mounted on the motor shaft to define a peripheral fan chamber wall around a substantial portion of the fan periphery. Intermediate such rib portions, the casing parts are provided with air outlet apertures. Air inlet apertures are provided in the casing wall at a point axially remote from the outlet apertures and on the other side of the motor with respect to the fan. Thence an air flow is produced through the casing which is axially directed past and through the motor elements and then radially discharge through the outlet apertures.

A still further feature of this invention is the provision of an improved latch for locking the detachable beater element shaft to the motor casing, thence assuring that such shaft will be maintained in driving relation with the motor.

In accordance with another feature of this invention, the casing for the power tool is formed by a joining of two complementarily shaped casing parts which are joinable along a plane parallel to the motor axis. Each of such casing parts includes a transverse extension which extensions are joinable to define a hollow handle portion for the power tool. A further feature of this invention is the utilization of such hollow handle portion to house a reactance element which is connected in circuit relation with the speed governor of the motor.

Accordingly, it is an object of the invention to provide an improved power tool, characterized by the simplicity of its components and the ease of manufacture and assembly of such components.

A further object of this invention is to provide an improved mounting block for the major motor elements of a power tool by which all of such motor elements may be pre-assembled prior to insertion of the mounting block within the casing of the power tool.

A further object of this invention is to provide an improved casing for a power tool characterized by the utilization of integral inwardly extending projections of such casing to define a fan chamber for the motor fan and by utilization of opposed apertures in such casing to permit a manual speed control member to be conveniently accessible exteriorly of the casing for manual operation thereof.

Another particular object of this invention is to provide an improved latch for securing the beater elements of a food mixer to the driving mechanism thereof.

Another object of this invention is to provide an improved casing for a power tool characterized by the formation of such casing by a pair of complementarily shaped casing parts joinable along a plane parallel to the motor axis and including transverse extensions joinable to define a hollow handle for the power tool.

A particular object of this invention is to provide an improved brush holder construction for a commutator type motor.

The specific nature of the invention as well as other objects and advantages thereof will become apparent to those skilled in the art from the following detailed description of the annexed sheets of drawings which, by way of preferred example only, illustrate one specific embodiment of the invention.

On the drawings:

Figure 1 is a side elevational view of a food mixer embodying this invention.

Figure 2 is a front elevational view, partly in section, of the food mixer of Figure 1, shown with one of the casing parts disposed in disassembled relation.

Figure 3 is an enlarged scale, side elevational view, partly in section, of the food mixer of Figure 1 with the right hand casing part of Figure 2 removed therefrom.

Figure 9 is an exploded perspective view of the individual components forming the motor assembly unit of Figure 4.

As shown on the drawings:

Figure 5:
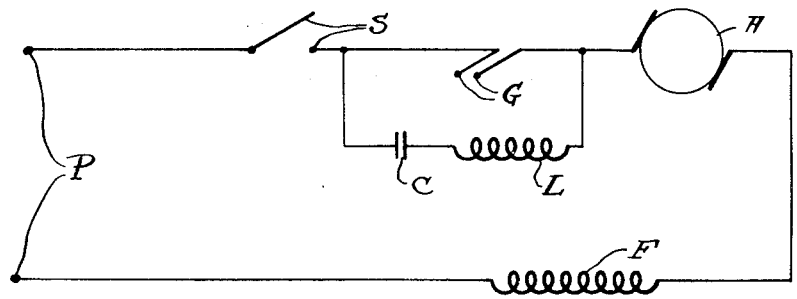
Figure 5 is a circuit diagram of the wiring connections of the motor.

While this invention has been illustrated as applied to a portable type food mixer, it should be understood that the principles thereof are applicable to any form of power tool.

Referring to the drawings, the numeral "I" indicates generally a food mixer type of power tool embodying this invention.

The casing 2 of the power tool is formed of two complementary casing parts, 2a and 2b, respectively, which are joinable along a plane substantially parallel to the axis of a motor unit 4 which is housed within the casing 2.

Each of the casing parts, 2a and 2b, are provided with generally U-shaped, integral, transverse extensions 6a and 6b which are joinable in the assembled position of the casing parts 2a and 2b to define a handle portion 6. Each of the extensions 6a and 6b are substantially channel shaped in cross-section so that the resultant handle portion 6 is a substantially hollow member having a bore 6c.

As is best shown in Figure 3, the casing part 2a is provided with a transverse web portion 8 at a point adjacent to but spaced upwardly from the bottom end wall 10 of casing 2. A complementarily shaped web portion (not shown) is provided in casing part 2b and, in the assembled position of casing parts 2a and 2b, cooperates with web portion 8 to divide the interior of casing 2 into an upper motor chamber 12 and a lower gear chamber 14.

Within the motor chamber 12, and at a point immediately adjacent the web 8, the casing parts 2a and 2b are respectively provided with integrally formed inwardly projecting ribs 16 (Fig. 8) which, as will be described in detail later, cooperate with motor fan to define a centrifugal fan chamber therefor. Ribs 16 have an inwardly facing arcuate surface 16a which are disposed in substantially opposed relationship and closely surround the periphery of the fan. Intermediate the rib portions 16, the casing parts 2a and 2b are respectively provided with air outlet apertures 18. Air inlet apertures 20 are provided in the walls of casing 2 at any convenient point axially spaced from air outlets 18, such for example as near the top of casing part 2a and within the top side wall portions of handle 6, as best shown in Figures 1 and 3.

At a point adjacent the top of the power tool, each of the casing parts 2a and 2b are provided with slot-like apertures 22 in the side walls thereof which, as will be described in detail later, permit the marginal portions of a manual control member to project therethrough.

Figure 7:
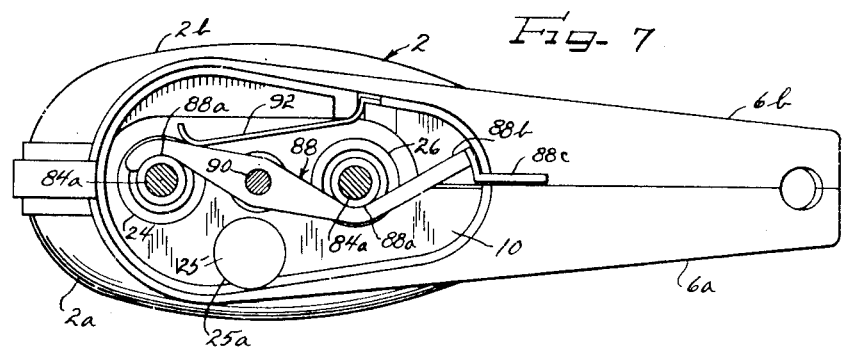
Figure 7 is a sectional view taken along the plane VII—VII of Figure 3 and with the bottom cover plate omitted.
Figure 10:
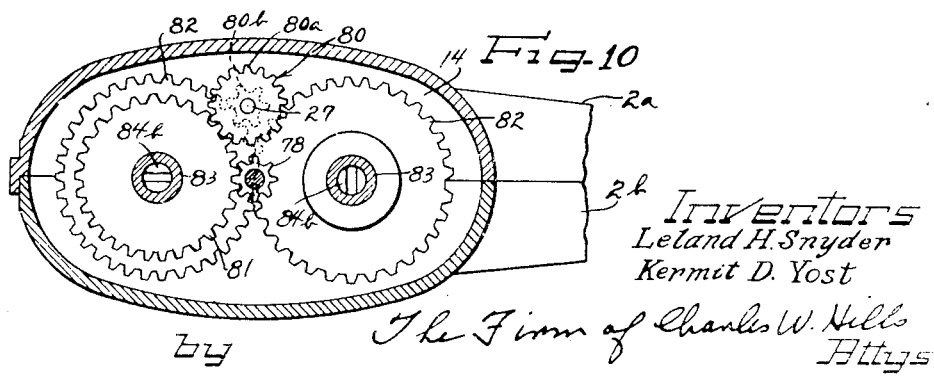
Figure 10 is a sectional view taken along the plane X—X of Fig. 3.

The web portion 8 of casing part 2a is provided with a central aperture 22 which receives a bearing for the motor shaft. In addition three radially spaced apertures 24, 25 and 26 are provided in web portion 8 and extended through the bottom end wall 10 of casing part 2a (Fig. 7) and project into the gear chamber 14. A stud shaft 27 (Figs. 2 and 10) is mounted in that portion of aperture 25 which lies in web portion 8 and projects into gear chamber 14. As will be described in more detail later, apertures 24 and 26 respectively journal driving sleeves for the beater elements of the food mixer.

Figure 4:
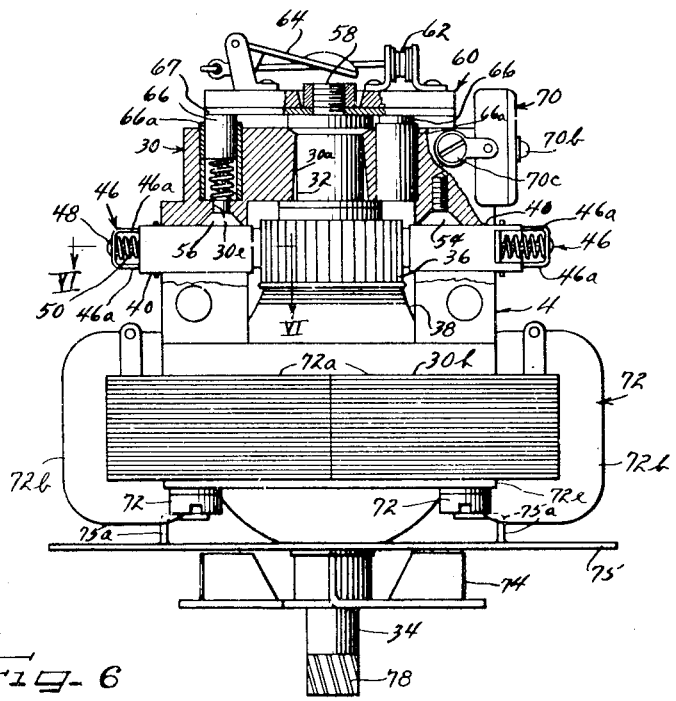
Figure 4 is an elevational view, partly in section, of the assembled motor unit utilized in the construction of Figure 1.
Figure 6:
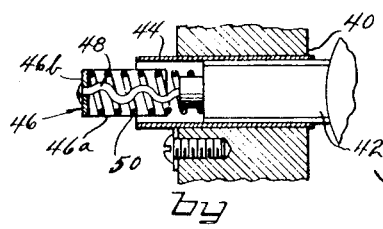
Figure 6 is a partial sectional view taken along the plane of VI—VI of Figure 4.

Referring now to Figures 3, 4 and 9, it will be observed that a motor assembly unit 4 is provided which comprises an insulating block member 30 upon which are mounted all of the major elements of the motor. While not limited thereto, the insulating block member 30 may be conveniently molded in one piece from suitable electrically insulating material.

Insulating block member 30 is of irregular configuration which, however, is clearly illustrated in Figure 9. Block member 30 includes a centrally disposed aperture 30a in which may be pressed a bearing sleeve 32 which journals one end portion of the motor armature shaft 34. While not limited thereto, the bearing sleeve 32 is preferably of the self-oiling type, such for example as a graphite impregnated construction which is well known in the art.

We preferably utilize a commutator type, universal motor and accordingly the armature shaft 34 of such motor includes a commutator 36 and an armature winding 38 mounted thereon. The block 30 is provided with a plurality of recesses 30b (Fig. 9) which are generally radially directed with respect to the axis of armature shaft 34 and are of channel shaped configuration.

Within each of such recesses 30b, a brush holder 40 is mounted and motor brushes 42 are movably mounted within brush holder 40 and cooperate with commutator 36 in conventional manner.

Particular attention is directed to the improved construction of the brush holders 40. Each brush holder 40 comprises a thin-walled, box-like member, conveniently formed by stamping operations, which defines a channel 44 open at each end in which the brush elements 42 are readily movable. The inner ends of the channel 44 defined by brush holder 40 are of course disposed in proximity to the commutator 36. The outer ends of the channels 44 are in effect closed by detachable end cap members 46. End cap member 46 is of generally U-shaped configuration and is preferably formed from spring metal. The arms 46a of end cap 46 are insertable within the channel 44 and outturned integral flanges 46c thereof engage in correspondingly shaped apertures 40a provided in the outer end of brush holders 40. The base portion 46b of the end cap members 46 is thus disposed in substantially transverse, closing relationship with respect to the channel 44. A flexible connection member 48 is secured between the base portion 46b and the outer end of the brush 42. A brush spring 50 is mounted in surrounding relationship to the flexible connection 48 and operates between the end cap 46 and the outer end of the brush 42. Thus when the brush holders 40 are assembled in insulating block 30, and the brushes 42 and end caps 46 are in turn assembled in the brush holders 40, the brush is spring pressed inwardly into engagement with the commutator 36. However, in the event that the commutator 36 is removed from engagement with the brushes by withdrawal of the armature shaft 34, it should be noted that the brushes 42 will move inwardly under the bias of the spring 50 only to the extent permitted by the flexible connection 48. Obviously, the flexible connection 48 may comprise the conventional pig-tail which is commonly provided in many other motor brush applications.

To effect the securing of the brush holders 40 within the recesses 30b of the insulating block 30, one side wall of each of the brush holders 40 is extended outwardly in a generally annular counterbored configuration as indicated at 40c and such punched out portions 40c permit a headed fastening member to be inserted therein without interfering with the free movement of the brushes 42 within the brush holders 40. A screw 54 passing thru the annular punch portion 40c is utilized to secure one of the brush holders 40 to insulating block 30 while a rivet 56 is utilized for the other brush holder 40 for a reason that will shortly appear.

The end portion of the commutator end of armature shaft 34 is of reduced diameter and provided with threads 58. Said threaded end portion 58 projects through insulating block 30 and receives thereon a centrifugally operated, electric switch type speed governor 60. Speed governor 60 may comprise any one of several well known forms and is particularly illustrated as constituting a governor of the type disclosed in U. S. Patent No. 1,767,146 issued June 24, 1930, to Royal Lee. Such governor includes a pair of switch contacts 62 which open at any selected one of a plurality of rotating speeds depending upon the axial position of an adjusting member 64. Electrical connection with the speed governor 60 is conveniently accomplished by the cooperation of a pair of governor brushes 66 with a pair of slip rings 67 which may be conveniently mounted on the back face of the speed governor disc.

In accordance with this invention, the speed governor brushes 66 are also carried by the insulating block member 30. Insulating block member 30 is provided with a pair of recesses 30c and 30d (Fig. 9) which respectively receive the governor brush holder sleeves 66a within which are mounted the governor brushes 66 and their cooperating springs 66b. As is best shown in Figures 3 and 4, recesses 30c and 30d are disposed in generally parallel relationship with the armature shaft 34 and hence lie in substantial perpendicularism to the radial recesses 30b which accommodate the motor brush holders. A reduced diameter hole 30e connects governor brush recess 30d with one of the armature brush recesses 30b. Through the hole 30e passes the rivet 56 by which the one brush holder 40 is secured to insulating block 30. In the interior of governor brush recess 30d, the end of rivet 56 is swaged over to obtain a permanent connection and the swaged over end is suitably secured, as by welding, to one end of a flexible connecting member 66c which has the other end thereof secured to governor brush 66. Hence connecting member 66c retains the governor brush 66 in assembly with the insulating block 30 even though the speed governor 60 is removed from contact therewith.

It should be noted that electrical as well as mechanical connections are accomplished by the rivet 56 inasmuch as it accomplishes electrical connection of the associated armature brush 42 with the associated governor brush 66.

The other governor brush recess 30c has one side thereof communicating with a generally L-shaped recess 30f provided in insulating block member 30 and such recess accommodates a contact plate 68 (Fig. 9) having a flat base portion 68a suitably shaped to lie in the bottom of the connecting recesses 30c and 30f and an upstanding side wall portion 68b having a threaded aperture 68c in the top thereof. The contact plate 68 provides electrical connection between one side of an electrical switch unit 70 and the associated governor brush 66. The electric switch unit 70, which may comprise any one of several well known forms, is mounted within a housing 70a and has an actuating plunger 70b projecting axially therefrom. Electric switch unit 70 is conveniently mounted on insulating block member 30 by means of a screw 70c which passes through a suitable threaded hole 30g in insulating block member 30 and then into the threaded hole 68c provided in contact plate 68. The screw 70c not only secures the switch unit 70 to the insulating block 30 but effects electrical connection between contact plate 68 and one side of the contacts (not shown) included within the electric switch unit 70. A circular portion of the base portion 68b of contact plate 68 underlies governor brush sleeve 66b and is suitably secured as by welding to one end of flexible connecting member 66c which has its other end secured to the respective governor brush. The spring 66b is mounted in surrounding relationship to the flexible connecting member and urges the respective governor brush 66 outwardly.

The field elements 72 of the motor unit 4 are of conventional construction comprising a pair of complementary, generally U-shaped lamination stackings 72a which mount respectively windings 72b across their base portions. One end face 30h of the insulating block member 30 is suitably shaped to conform to one side face of the field element 72 and hence permits such field element to be snugly secured to the insulating block member 30f by suitable screws 72d which pass through coupling plates 72e. It should be noted that the insulating block member 30 is suitably recessed as indicated at 30j to receive the adjacent portions of the field winding 72b.

A fan 74 is assembled on the motor unit, being mounted on the end of armature shaft 34 opposite to the commutator 36. Prior to mounting of fan 74 on shaft 34, an annular air baffle plate 75 is slipped over shaft 34 to lie intermediate fan 74 and field elements 72, for a purpose to be described.

From the construction thus far described, it is apparent that all of the major components of the motor unit 4, including the field structure, the armature, the armature brushes, the speed governor, the speed governor brushes, the fan, and the electric switch may be preassembled upon the insulating block member 30 to achieve the motor assembly unit 4 in the condition illustrated in Figure 4.

The motor unit 4 is in turn assembled within casing part 2a by means of suitable screws 76 (Figs. 1 and 9) which pass through the exterior wall of casing part 2a into suitably threaded holes provided in insulating block member. Likewise, when the cooperating casing part 2b is brought into assembled position with respect to casing part 2a, screws 76 are utilized to secure such casing part to insulating block member 30.

The fan end of armature shaft 34 is journalled in a suitable self oiling bearing sleeve 79 which is in turn mounted in the bearing aperture 22 provided in the web 8 in casing part 2a. Similar bearing sleeves are provided in apertures 24, 25 and 26. The extreme end portion of armature shaft 34 projects through the web 8 into gear chamber 14 and is provided with integrally formed gear teeth 78. A large idler gear 81 is journaled on a driving sleeve 83 which in turn is journaled in aperture 24 in casing part 2a. Idler gear 81 is driven by the armature shaft gear teeth 78. A reduction idler gear unit 80 is rotatably journalled on the stud shaft 27 which is supported in the web 8 and comprises a large gear 80a which is engaged by the large idler gear 81, and a small gear 80b (Fig. 2) which is geared to one of two intermeshed large driving gears 82. Each of the driving gears 82 is respectively mounted upon and secured to driving sleeves 83 which are respectively journalled in the apertures 24 and 26 provided in the web portion 8 and bottom end wall 10 of casing part 2a.

After assembly of the gears within gear chamber 14, the opening of aperture 25 in end wall 10 is sealed by a pressed-in plug 25a. The openings of apertures 24 and 26 receive identical annular bushings 29 which are threaded into apertures 24 and 26 respectively and provide further bearing support for driving sleeves 83. In addition, bushings 29 cooperate with integral flanges 83a on driving sleeves 83 to retain such sleeves in assembly. Leather washers 31 prevent leakage of lubricant and threaded retainer washers 33 secure leather washers 31 within apertures 24 and 26 respectively. From the construction described, it is apparent that when the casing parts 2a and 2b are assembled together, the gear chamber 14 is substantially completely enclosed and accordingly may be packed with grease or other heavy lubricant and hence requires no further oiling attention after having been initially assembled.

The beater elements 84 comprise a shaft member 84a and beater arm elements 84b secured to such shaft member in any suitable manner to define the conventional beater loop. To provide a driving connection between the driving sleeve 83 and the respective beater shaft 84a, the top ends of the beater shafts 84a are bifurcated as indicated at 84c (Fig. 3) and such bifurcated portions cooperate respectively with transverse pins 86 which are mounted in each of the driving sleeves 83. As best shown in Fig. 3, the ends of pin 86 lie in slots in the respective driving gear 82 and provide a driving connection between such gear and sleeve elements. Thus a driving connection is effected between motor unit 4 and each of the beater elements 84 so long as such beater elements are sufficiently inserted within the driving sleeves 83 to engage the bifurcated end portion 84c thereof with the cross pin 86.

To assure that the beater elements 84 will remain in their inserted position in the driving sleeve 83, a beater latch 88 is mounted on the bottom face of end wall 10 of casing part 2a. Beater latch 88 is pivotally mounted to casing end wall 10 by a bolt 90 which is threaded into the casing part 2a at a point intermediate the axes of driving sleeves 83. The latch 88 comprises a relative flat strip-like member which is medially pivoted on the bolt 90 and has its free end portions shaped to lie on opposite sides of the beater shafts 84a of the beater elements 84, so that pivotal movement of the latch 88 will bring arcuate blocking surfaces 88a thereon into respective engagement with the beater shafts. Each of the beater shafts is provided with an outwardly facing shoulder, which, in the latching position of latch 88 is disposed immediately behind the latch 88. Such shoulder may be conveniently formed by an annular groove 84d provided in a radially enlarged portion 84e on the beater shaft 84a. Means such as the leaf spring 92 are provided which urges the latch 88 to its locking position relative to the beater shaft 84a.

One end of the latch 88a is extended as indicated at 88b and thence bent downwardly to form a finger portion 88c. A cover plate 94 is fitted into the bottom end face 10 of the casing 2, being suitably apertured, of course, to permit the beater shaft elements 84a to pass therethrough. The finger element 88c of the latch 88 then projects down through a suitable marginal slot provided in the cover plate 94.

Figure 8:
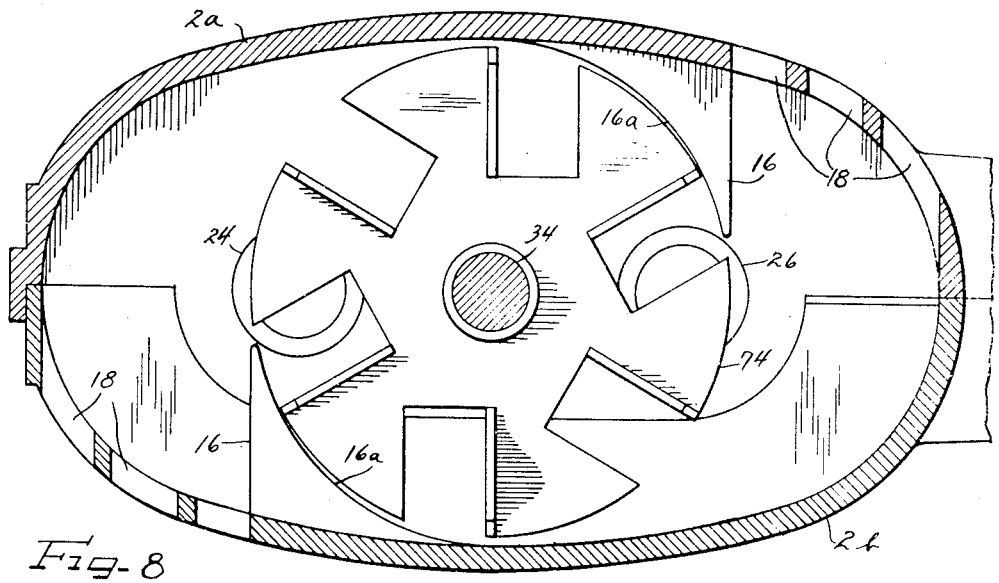
Figure 8 is a sectional view taken along the plane VIII—VIII of Figure 1.

As heretofore indicated, in the assembled position of the motor unit 4 within the casing 2, the fan 74 lies intermediate the inwardly projecting ribs 16 (Fig. 8). As was heretofore mentioned, the annular air baffle plate 75 is disposed intermediate the field structure 72 and the fan 74 and rests on the upper end face of the inwardly projecting rim 16. Ear portions 75a are struck up from air baffle plate 75 and resiliently rest against the head ends of field screws 72 to urge air baffle plate 75 downwardly into snug engagement with the top end wall of the inwardly projecting ribs 16. The central opening in annular air baffle plate 75 directs the air flowing axially through the motor casing into the central portion of the fan 74, and hence promotes the air moving efficiency of the fan 74. The path of the air circulation set up constitutes an axial flow through the motor elements and the major portion of the casing 2 and thence a radial flow outwardly through the outlet apertures 18.

To permit the axial position of the adjusting member 64 of speed governor 60 to be manually adjustable from the exterior of casing 2, an intermediate lever 96 (Fig. 3) is provided having one end thereof pivoted to a suitable stud 96b mounted in the interior of casing part 2a and the other end carrying a spherical surface contact member 96a which is in engagement with the similarly shaped surface portion 64a of adjusting member 64. It is therefore apparent that pivotal movement of the intermediate lever 96 about its pivotal mounting will produce an axial movement of the adjusting member 64 and hence control the speed of motor unit 4.

The pivotal movement of intermediate lever 96 is in turn controlled by a manual control member 98. Manual control member 98 comprises a generally circular member which is rotatably mounted adjacent the top end of casing part 2 upon a cylindrical end surface portion 102 of a stud 100 which is screwed into the top end wall of casing part 2a. When the casing parts 2a and 2b are assembled, the marginal portions 98a (Fig. 2) of manual control member 98 project outwardly through the opposed apertures 22 provided in the casing parts and hence permits the manual control member to be readily rotated by the thumb or finger of the operator. Manual control member 98 also has a depending annular cam portion 98b which varies in height around its periphery. Cam portion 98b is arranged to contact the central portion of intermediate lever 96 and hence controls the pivotal position of intermediate lever 96 and in turn controls the speed of motor unit 4. It should be particularly noted that the manual control member is retained on the cylindrical portion of stud 100 by engagement of its marginal portion with the side walls of the apertures 22.

To permit the electric switch unit 70 to be controlled from the exterior of the casing 2, a "dead man" type actuating lever 104 is provided which is medially pivoted on a suitable stud 106 mounted in the top portion of the handle extensions 6a of casing part 2a. One end portion 104a of "dead man" switch lever 104 is disposed in abutting engagement with the operating projection 70b of switch unit 70. The other end 104b of "dead man" switch lever 104 projects out of the handle portion 6 through a suitable aperture 6d. The portion 104b is thus disposed in a convenient position to be engaged by the fingers or thumb of the operator when he is holding the mixer in its normal position of use and the resulting pressure upon the dead man switch lever 104 will depress operating plunger 70b of switch unit 70 to close the contacts thereof.

Suitable wiring is of course provided to effectuate the necessary electrical interconnections of the motor, motor governor, and switch elements. The resulting circuit diagram is illustrated in Figure 5 wherein A indicates the armature circuit of the motor and F the field coils of the motor. The contacts of the centrifugal type, electric switch speed governor 60 are indicated by G while the contacts of the electrical switch unit 70 are indicated by S. The contacts G and S, the motor armature A and the field coils F are connected in series circuit relationship across the terminals P of a suitable source of electric power. In addition, the contacts G of the speed governor are shunted by a special circuit comprising a condenser C and a small inductance L. Condenser C is of the size generally utilized in such applications while inductance L preferably comprises an air core inductance of about 40 turns of approximately one half inch diameter. The described circuit arrangement has been found particularly effective in producing not only satisfactory commutation of the motor unit 4, but also in reducing sparking of the governor contacts G and deterioration of the governor brushes 66.

In accordance with this invention, the hollow portion 6c of handle 6 is conveniently utilized to house one of the reactance elements of the circuit shunting the contacts G of the governor. In the particular example illustrated, the condenser C is mounted within the hollow portion of handle 6 while the inductance element L is suitably mounted within the casing 2. Electric power is conveniently supplied to the motor by wires 106 which are also disposed within the hollow portion of the handle 6.

In operation, the beater shaft elements are inserted in the driving sleeves 83 and the latch released to lock such elements to the casing 2. The operator then grasps the handle 6 in such manner to depress the projecting portion 104b of the dead man switch 104 which energizes the motor unit 4 by closing the contacts S of the switch unit 70. The motor will then operate at a speed determined by the centrifugal speed governor 60, which in turn is determined by the particular rotative position of the manual control member 98. The location of the manual control member 98 relative to the handle 6 may obviously be such as to permit the control member to be conveniently adjusted by the same hand that the operator utilizes to hold the mixer, thus leaving one hand of the operator free for other purposes.

A power tool constructed in accordance with this invention is particularly adaptable to manufacture by large quantity production methods inasmuch as the majority of the components may be produced by stamping, casting or molding processes and require a minimum of time consuming and expensive milling processes. The fact that the motor unit 4 may be completely assembled exteriorly of the casing 2 further contributes to the ease and economy of manufacture of a power tool embodying this invention.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A power tool comprising in combination, a casing, a motor mounting block secured in said casing, said mounting block having a central web portion defining a bearing, an armature having one end thereof journalled in said bearing, said block having generally radially extending recesses, motor brushes movably mounted in said recesses and cooperable with said armature, and magnetic field elements mounted on said block in cooperable relation to said armature, a centrifugal type electric switch speed governor mounted on said armature, said block also having recesses extending into proximity with said speed governor, governor brushes movably mounted in said last mentioned recesses engageable with said speed governor to effect electrical connection therewith, and means for electrically interconnecting said governor brushes, said armature and said field elements.

2. A power tool comprising in combination, a casing, a motor mounting block of insulating material secured in said casing, said block being recessed to accommodate a rotatable motor armature, said block having first brush recesses generally radially disposed relative to said armature, metallic brush holders disposed in said first recesses, said block also having second brush recesses, speed governor brushes movably mounted in said second brush recesses, a switch, fastening means for securing said switch to said block, one of said fastening means constituting an electric connection between one of said governor brushes and said switch, and fastening means for securing said motor brushholders to said block, at least one of said last mentioned fastening means constituting an electric connection between said motor brush holder and the other one of said governor brushes.

3. A power tool comprising in combination, a casing, a motor mounting block of insulating material secured in said casing, said mounting block having a central web portion defining a bearing, an armature having one end thereof journalled in said bearing, magnetic field elements mounted on said block in cooperable relation with said armature, said block having generally radially extending recesses, motor brush holders mounted in said radial recesses cooperable with said armature, a centrifugal type electric switch speed governor mounted on said armature adjacent one end face of said block, said block having a pair of recesses opening in said end face, governor brushes respectively mounted in said last mentioned recesses engageable with said speed governor to effect electric connection therewith, a primary control switch mounted on said block, a first metallic fastener for securing said switch to said block and electrically connecting said switch and one of said governor brushes, and a second metallic fastener for securing one of said motor brush holders to said block and electrically connecting said one motor brush holder and the other of said governor brushes.

4. In a power tool having a motor, a casing enclosing said motor comprising a pair of complementary casing parts joinable along a plane substantially parallel to motor axis, each of said casings having an aperture in the wall thereof, said apertures being oppositely disposed in the assembled position of said casing parts, and a circular, manual control member for said motor journalled within said casing and having oppositely disposed marginal portions thereof projecting outwardly through said apertures permitting manual rotation of said control member.

5. In a power tool having a motor and a speed governor therefor, a casing enclosing said motor and speed governor comprising a pair of complementary casing parts joinable along a plane substantially parallel to motor axis, each of said casings having an aperture in the wall thereof, said apertures being oppositely disposed in the assembled position of said casing parts, a circular, manual control member for said motor journalled within said casing and having oppositely disposed marginal portions thereof projecting outwardly through said apertures permitting manual rotation of said control member, and means for operatively connecting such manual control member to said speed governor, whereby the rotational position of said manual control member determines the speed of said motor.

6. In a power tool having a motor and a speed governor therefor, a casing enclosing said motor and speed governor comprising a pair of complementary casing parts joinable along a plane substantially parallel to the motor axis, each of said casings having an aperture in the wall thereof at a point near one axial end of such casing parts, said apertures being oppositely disposed in the assembled position of said casing parts, a stud secured in one of said casing parts in a position substantially axially aligned with the motor, said stud having a cylindrical end portion lying within the casing, a circular manual control member rotatable on said cylindrical end portion and having oppositely disposed marginal portions thereof projecting outwardly through said apertures, whereby said manual control member is retained on said cylindrical portion and accessible exteriorly of the casing for manual rotation of said control member, and means for operatively connecting said manual control member to said speed governor, whereby the rotational position of said manual control member determines the speed of said motor.

7. In a power tool having a motor and a speed governor therefor, an arcuately shaped casing enclosing said motor and speed governor comprising a pair of complementary casing parts joinable along a longitudinal plane relative to the motor axis, at least one of said casings having an aperture in the wall thereof, a circular manual control member rotatably journalled in one of said casing parts in a position substantially actually aligned with said motor and having a marginal portion projecting outwardly through said aperture in the assembled position of said casing parts, and means for operatively connecting said manual control member to said speed governor whereby the rotational position of said manual control member determines the speed of said motor.

8. In a power tool having a motor and a speed governor therefor, a casing enclosing said motor and speed governor comprising a pair of complementary casing parts joinable along a plane substantially parallel to the motor axis, each of said casing parts having an aperture in the wall thereof, said apertures being oppositely disposed in the assembled position of said casing parts, said casing parts having complementary transverse extensions joinable in the assembled position of said casing parts to define a handle portion, a circular manual control member journalled within said casing and having oppositely disposed marginal portions thereof projecting outwardly through said apertures permitting manual rotation of said control member, and means for operatively connecting said manual control member to said speed governor, whereby the rotational position of said manual control member determines the speed of said motor.

9. In a power tool having a motor and a centrifugally operated, electric switch, speed governor therefor, a casing enclosing said motor and speed governor comprising a pair of complementary casing parts joinable along a plane substantially parallel to the motor axis, said casing parts having complementary transverse extensions joinable in the assembled position of said casing parts to define a hollow handle portion, a reactance element housed in said hollow handle portion, and means connecting said reactance element in circuit with said speed governor.

10. In a power tool having a motor and a speed governor therefor, a casing enclosing said motor and speed governor comprising a pair of complementary casing parts joinable along a plane substantially parallel to the motor axis, each of said casing parts having an aperture in the wall thereof at a position near one axial end of the respective casing part, said apertures being oppositely disposed in the assembled position of said casing parts, said casing parts having complementary, transverse extensions joinable in the assembled position of said casing parts to define a hollow handle portion, a reactance element housed in said hollow handle portion, means connecting said reactance element in circuit with said speed governor, a circular, manual control member journalled within said casing and having oppositely disposed marginal portions thereof projecting outwardly through said casing apertures, permitting manual rotation of said control member, and means for operatively connecting said manual control member to said speed governor, whereby the rotational position of said manual control member determines the speed of said motor.

11. A power tool comprising a motor, a fan driven by said motor, a casing surrounding said motor and fan, said casing having integral, inwardly projecting rib portions each extending partially about the periphery thereof and cooperating with said fan to define a peripheral fan chamber wall therefor, said casing having air outlet apertures disposed intermediate said rib portions and air inlet apertures axially remote from said fan and on the other side of said motor, thereby producing cooling air flow axially past said motor and radially out of said casing outlet apertures.

12. A power tool comprising a motor, a centrifugal fan driven by said motor, a casing surrounding said motor and fan, said casing comprising a pair of complementary casing parts joinable along a plane substantially parallel to the motor axis, each of said casing parts having an inwardly projecting rib portion extending partially around the radial periphery thereof, said rib portions being constructed and arranged to cooperate with the periphery of said fan to define a peripheral fan chamber wall therefor in the assembled relation of said casing parts, at least one of said casing parts having air outlet apertures disposed adjacent said rib portion, said casing having air inlet apertures axially remote from said fan and on the other side of said motor, thereby producing cooling air flow axially past the motor and radially out of said casing outlet apertures.

13. In a commutator type motor having an armature, brushes and a field structure, the improvements of an integral block of insulating material having an aperture for journalling the armature, recesses for supporting said brushes in cooperable relation to said armature, and wall portions constructed and arranged for securement of said field structure thereto in cooperable relation to said armature.

14. In a speed controlled, commutator type motor having an armature, armature brushes, field structure and speed governor brushes, the improvements of an integral molded block of insulating material having an aperture for journalling the armature, first recesses for supporting said armature brushes in cooperable relation to said armatures, second recesses for supporting said speed governor brushes, and wall portions constructed and arranged for securement of said field structure thereto in cooperable relation to the armature.

LELAND H. SNYDER.
KERMIT D. YOST.

REFERENCES CITED

The following references are of record in the file of this patent:

UNITED STATES PATENTS

| Number | Name | Date |
| --- | --- | --- |
| 2,048,096 | Bisley | June 21, 1936 |
| 2,048,455 | Knapp | July 21, 1936 |
| 2,093,534 | Wright | Sept. 21, 1937 |
| 2,096,618 | Newnham et al. | Oct. 19, 1937 |
| 2,106,058 | Nielsen et al. | Jan. 18, 1938 |
| 2,114,102 | Collins | Apr. 12, 1938 |
| 2,211,006 | Doughman | Aug. 13, 1940 |
| 2,291,775 | Tucker | Aug. 4, 1942 |
| 2,323,945 | Strauss et al. | July 13, 1943 |
| 2,346,778 | Mitchell | Apr. 18, 1944 |
| 2,348,341 | Gough | May 9, 1944 |

FOREIGN PATENTS

| Number | Country | Date |
| --- | --- | --- |
| 548,456 | Great Britain | Oct. 12, 1942 |